H. E. DE VAUGHN.
FLATTENING DEVICE.
APPLICATION FILED OCT. 6, 1916.
1,302,485.
Patented Apr. 29, 1919.
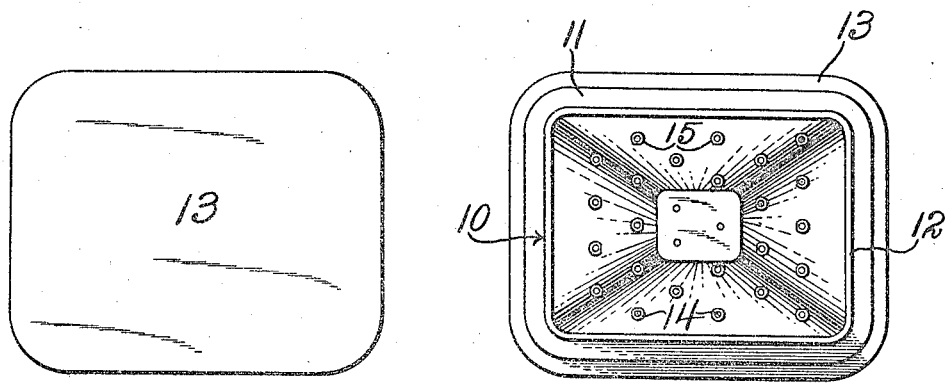
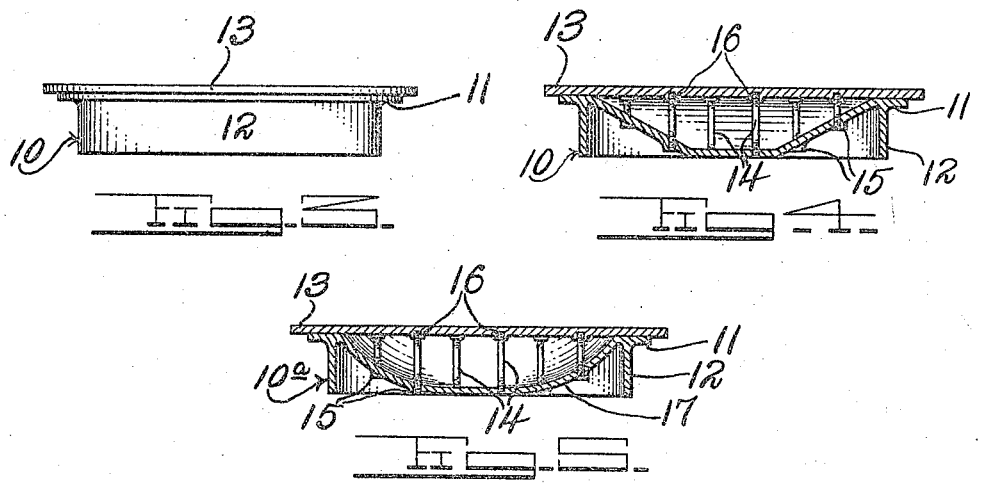
Inventor
Harry E. De Vaughn
By [signature]
Attorney

UNITED STATES PATENT OFFICE.

HARRY E. DE VAUGHN, OF MORGANTOWN, WEST VIRGINIA, ASSIGNOR TO WALTER A. JONES, OF MORGANTOWN, WEST VIRGINIA.

FLATTENING DEVICE.

1,302,485. Specification of Letters Patent. Patented Apr. 29, 1919.

Application filed October 6, 1916. Serial No. 124,092.

*To all whom it may concern:*

Be it known that I, HARRY E. DE VAUGHN, a citizen of the United States, residing at Morgantown, in the county of Monongalia and State of West Virginia, have invented new and useful Improvements in Flattening Devices, of which the following is a specification.

This invention is a device for use in connection with the flattening of window glass and the like.

One of the objects of the invention is to provide a metal flattening plate which will serve as a substitute for the clay flattening stone now in general use. A further object is to provide a metal flattening plate of the character referred to, and means for preventing warping or distortion thereof due to the intense heat to which the same is subjected in the flattening oven. A further object is to provide a flattening plate or stone so constructed that the top thereof may be removed and replaced, without removing the entire structure from the flattening oven. A further object is to provide a metal flattening plate or stone so constructed that the top part on which the glass is flattened, may be made of any metal found suitable for the purpose, and the bottom part made of a different metal if so desired.

The invention will be hereinafter fully set forth and particularly pointed out in the claims.

In the accompanying drawings:—

Figure 1 is a top plan view of the improved metal plate or flattening stone. Fig. 2 is a bottom plan view thereof. Fig. 3 is a side elevation. Fig. 4 is a transverse sectional view. Fig. 5 is a similar sectional view illustrating a slight modification.

Referring to the drawing, 10 designates a base of bowl-like structure, preferably of inverted frusto-pyramidal form, provided with a supporting rim 11, having a depending flange or side 12. The top plate 13 is provided with a perfectly flat and smooth top surface, said plate resting upon the rim 11. To maintain the top plate 13 in position upon the base 10, stud bolts 14 are employed, said bolts being threaded through bosses 15 in the base, and engaging threaded portions 16 in the top plate. The stud bolts are placed quite close together, and by reason of the peculiar shape of the base, and the joining together of the base and the top plate at many points, it will be readily seen that the top plate is securely held so that it cannot become warped or distorted when subjected to the intense heat of the flattening oven. If desired, the top plate may be made of one metal, and the base of a different metal, and should it become necessary to remove the top plate for repairs, resurfacing, re-polishing, or re-placement, the same may be readily removed by withdrawing the stud bolts 14, and without necessitating the dismantling or removing the structure of the oven.

In Fig. 5 is illustrated a slight modification in which the base $10^a$ is provided with a curved bottom wall 17, in lieu of the general pyramidal form of Fig. 1.

Having thus explained the nature of the invention, and described an operative manner of constructing and using the same, although without attempting to set forth all of the forms in which it may be made, or all of the forms of its use, the following is claimed:—

1. A flattening device of the character described comprising a base, a metallic flattening plate resting upon said base, and connecting means for drawing said base and said plate together in a normally immovable relation, said connecting means being of a nature to permit the base and the plate to separate when separation is desired.

2. A flattening device of the character described comprising a base provided with an elevated rim, a metallic flattening plate resting upon said rim, and connecting means engaging the plate and the base within the periphery of the rim for drawing them together in a normally immovable relation, said connecting means being of a nature to permit the base and the plate to separate when separation is desired.

3. A flattening device of the character described comprising a bowl-like base, a metallic flattening plate resting upon the rim of said base, and connecting means engaging the plate and the base to draw them together in a normally immovable relation, said connecting means being of a nature to permit the base and the plate to separate when separation is desired.

4. A flattening device of the character described comprising a bowl-like base provided with a peripheral supporting rim, a metallic flattening plate resting upon said rim, and connecting means engaging the plate and the bowl-like portion of the base for drawing them together in a normally immovable relation, said connecting means being of a nature to permit the base and the plate to separate when separation is desired.

5. A flattening device of the character described comprising a bowl-like base provided with a supporting rim and a depending flange, a flattening plate resting upon said rim, and means for connecting the plate and the base to prevent warping of said plate.

6. A flattening device of the character described comprising a base having a bottom wall sloping inwardly and downwardly from the top of the base, a flattening plate supported by said base, and stud bolts connecting said flattening plate and the bottom wall of said base.

In testimony whereof I have hereunto set my hand in presence of two subscribing witnesses.

HARRY E. DE VAUGHN.

Witnesses:
A. EDW. HELGREN,
WM. M. SHEAVLY.

Copies of this patent may be obtained for five cents each, by addressing the "Commissioner of Patents, Washington, D. C."